United States Patent [19]
Nomoto

[11] Patent Number: 5,539,722
[45] Date of Patent: Jul. 23, 1996

[54] OPTICAL INFORMATION REPRODUCING SYSTEM WITH A READING BEAM HAVING FREQUENCY COMPONENTS OF N WAVELENGTHS CORRESPONDING TO FOUR TIMES THE N DEPTHS TO A ROW OF PITS

[75] Inventor: Takayuki Nomoto, Tokorozawa, Japan

[73] Assignee: Pioneer Electronic Corporation, Tokyo, Japan

[21] Appl. No.: 441,576

[22] Filed: May 15, 1995

Related U.S. Application Data

[62] Division of Ser. No. 19,271, Feb. 18, 1993, abandoned.

[30]   Foreign Application Priority Data

Apr. 9, 1992  [JP]  Japan .................................... 4-088681

[51] Int. Cl.$^6$ ........................................................ G11B 7/24
[52] U.S. Cl. ........................ 369/121; 369/275.1; 369/124; 369/109; 369/275.4
[58] Field of Search ............................ 369/275.4, 109, 369/111, 112, 110, 116, 275.1, 124

[56]            References Cited

U.S. PATENT DOCUMENTS

| | | | |
|---|---|---|---|
| 4,674,070 | 6/1987 | Tajima et al. | 369/275.4 |
| 4,896,313 | 1/1990 | Hirose et al. | 369/109 |
| 4,963,464 | 10/1990 | Setani | 369/109 |
| 5,065,377 | 11/1991 | Spruit et al. | 369/13 |
| 5,235,587 | 8/1993 | Bearden et al. | 369/106 |
| 5,295,131 | 3/1994 | Ishibashi et al. | 369/275.3 |
| 5,375,109 | 12/1994 | Morimoto et al. | 369/116 |
| 5,453,969 | 9/1995 | Psaltis et al. | 369/275.4 |

FOREIGN PATENT DOCUMENTS

| | | |
|---|---|---|
| 0376626 | 7/1990 | European Pat. Off. . |
| 0516906 | 12/1992 | European Pat. Off. . |
| 2396378 | 1/1979 | France . |
| 59-207433 | 11/1984 | Japan . |

OTHER PUBLICATIONS

European Search Report, dated Jul. 22, 1993.

*Primary Examiner*—Georgia Y. Epps
*Assistant Examiner*—Kim-Kwok Chu
*Attorney, Agent, or Firm*—Sughrue, Mion, Zinn, Macpeak & Seas

[57]            ABSTRACT

Disclosed is an optical disk having at least one pit in each of unit areas continuously provided in a circumferential direction of the disk, said pit having a depth of at least one of n depths (n: an integer equal to or greater than 2). Also disclosed is an information reproducing method of reproducing pit information from such an optical disk. This method comprises the steps of irradiating a read beam having frequency components of n wavelengths corresponding to four times the n depths to a row of the unit areas, and acquiring pit information based on an intensity distribution in a plane perpendicular to the optical axis of a reflected beam from the row of unit areas.

3 Claims, 7 Drawing Sheets

FIG.7(a)   FIG.7(b)
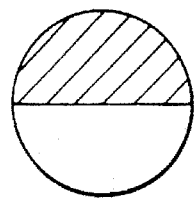 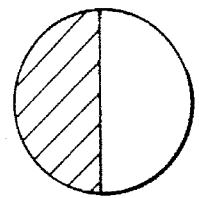
FIG.7(c)   FIG.7(d)
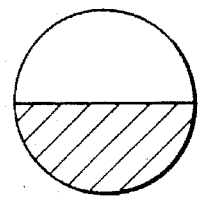 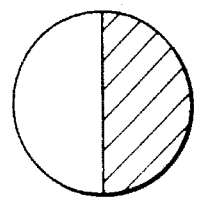
FIG.8
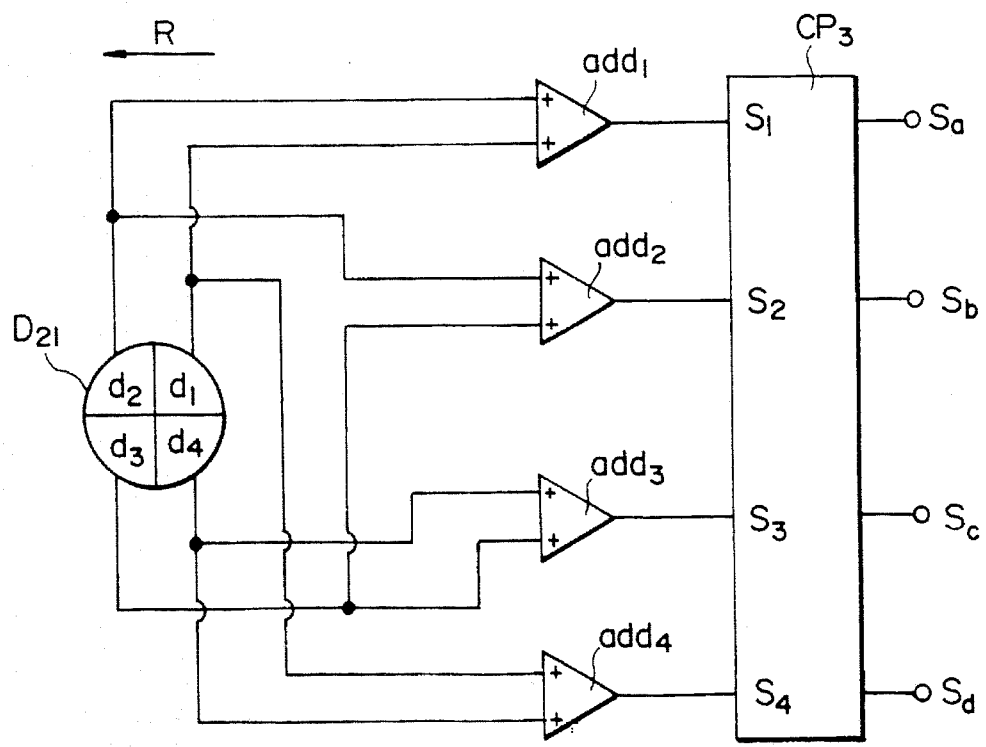

OPTICAL INFORMATION REPRODUCING SYSTEM WITH A READING BEAM HAVING FREQUENCY COMPONENTS OF N WAVELENGTHS CORRESPONDING TO FOUR TIMES THE N DEPTHS TO A ROW OF PITS

This is a divisional of application Ser. No. 08/019,271 filed Feb. 18, 1993, now abandoned as of Aug. 18, 1995.

BACKGROUND OF THE INVENTION

1. Field of the Invention

The present invention relates to an optical disk and an optical-disk information reproducing method of reproducing recorded information from the optical disk.

2. Description of the Related Art

Conventional optical disks, such as compact disks (CDs) or video disks (VDs), have pit information recorded in the form of the presence or absence of pits with a given depth and length. The pit information is reproduced with a read beam of a single wavelength.

The amount of information recordable on such an optical disk is restricted by the sizes of the pits and the read beam spot (the wavelength $\lambda$ and the number of apertures NA of the objective lens), so that the recording density has reached the maximum level at present.

It is therefore difficult to further improve the recording density of information on an optical disk.

SUMMARY OF THE INVENTION

Accordingly, it is an object of the present invention to provide an optical disk designed to improve the information recording density, and an optical-disk information reproducing method of reproducing pit information from the optical disk.

To achieve this object, an optical disk according to the present invention has pit information recorded by setting the depth of at least one of the pits provided in individual unit areas continuously provided in the circumferential direction to one of n types of depths (n: an integer equal to or greater than 2).

An optical-disk information reproducing method embodying the present invention irradiates a read beam including frequency components of wavelengths respectively equal to four times n types of depths of pits on an optical disk and acquires pit information based on a reflected beam from each of the unit areas.

According to the information reproducing method of this invention, pit information is acquired by the level of a difference signal representing the difference between received light signals from a plurality of receiving surfaces perpendicular to the optical axis of the reflected beam of each unit area on an optical disk. In addition, the information about the presence of divided pits for each divided area or arrangement information is acquired by comparing the levels of sum signals of received light signals from a plurality of receiving surfaces perpendicular to the optical axis of the reflected beam.

BRIEF DESCRIPTION OF THE DRAWINGS

FIGS. 7(a) to 7(d) are explanatory diagrams showing the intensity distributions of a reflected beam on the light-receiving surfaces of a photodetector when a read beam is irradiated on the pits arranged as shown in (a) to (d) in FIG. 6;

FIG. 8 is a circuit diagram showing a circuit to detect the pit arrangement;

DETAILED DESCRIPTION OF THE PREFERRED EMBODIMENTS

Preferred embodiments of the present invention will now be described referring to the accompanying drawings.

Figure 1:
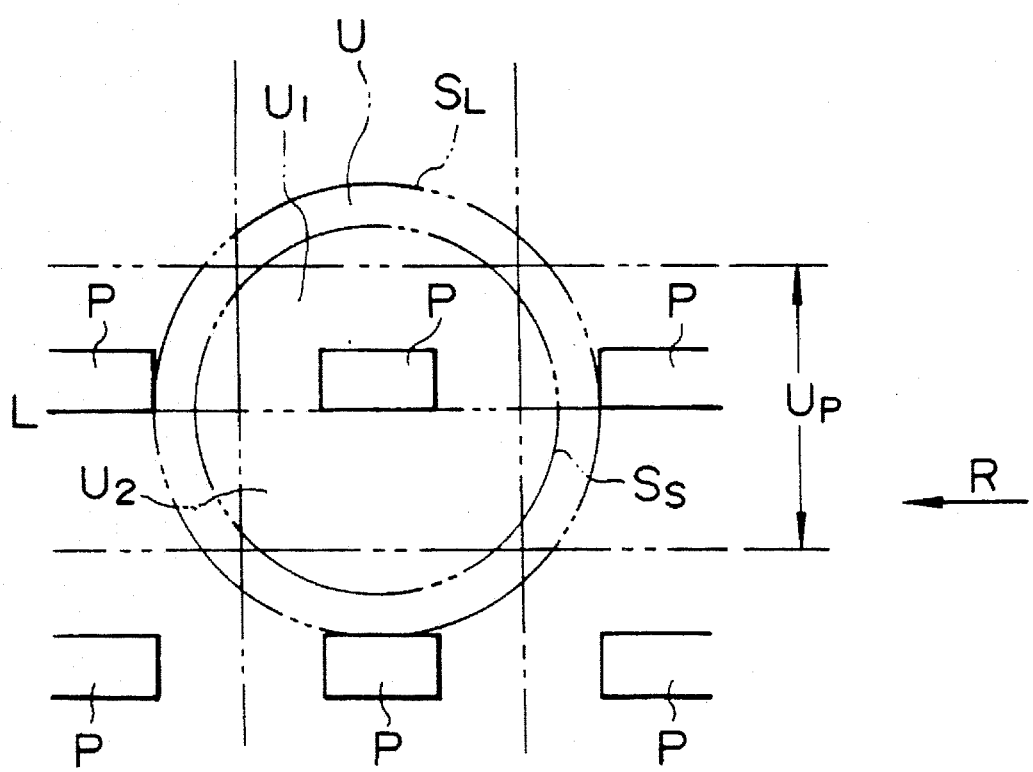
FIG. 1 is an exemplary diagram illustrating the arrangement of pits on the recording surface of an optical disk according to a first embodiment of the present invention.

FIG. 1 is an exemplary diagram illustrating the arrangement of pits on the recording surface of an optical disk according to a first embodiment of the present invention.

In FIG. 1, a square unit area U is set in the circumferential direction of an optical disk or in the information recording direction R. The unit area U is divided into a first subunit $U_1$ and a second subunit $U_2$ with a center line L. The length $U_P$ of each side of the unit area U represents the pitch between rows of pits or the pitch between tracks.

Pits P are provided in the first subunit $U_1$. The pits P have one of n depths (n: an integer equal to or greater than 2).

A read beam to be irradiated on an optical disk according to this invention forms a beam spot $S_S$ of the shortest wavelength $\lambda_S$ and a beam spot $S_L$ of the longest wavelength $\lambda_L$.

The wavelengths of a plurality of components included in the read beam are respectively four times the n depths of the pits P. That is, with the wavelength of $\lambda_n$ and the pits P having a depth of $\Delta_n$, $\lambda_n = 4 \cdot \Delta_n$.

The length $U_P$ of each side of the unit area U should be determined to be equal to or greater than $\lambda_L/(2 \times NA)$ where NA is the number of apertures of the objective lens and the longest wavelength $\lambda_L$ of beam components included in the read beam.

When the length $U_P$ is set close to the cutoff frequency of the so-called OTF (Optical Transfer Function) of the pickup optical system, however, the level of the received light signal becomes smaller. In consideration of the wavelength characteristic of the output of the photodetector and a variation in the level of a beam component, it is preferable to set $U_P$ to be about $\lambda_L/(2^{1/2} \times NA)$.

FIG. 2 illustrates an apparatus for reading information from a disk having such pits P.

Figure 2A:
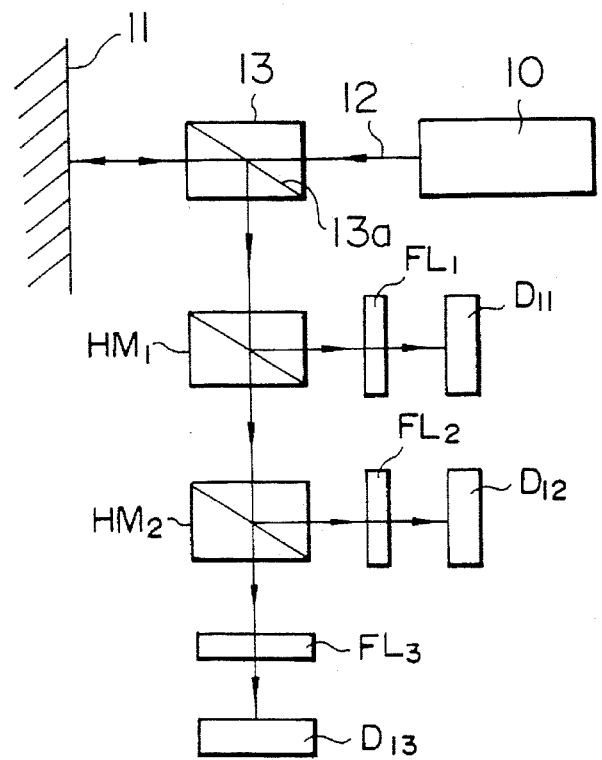
FIGS. 2A and 2B respectively present a cross section showing the optical system of a pickup which picks up information from the optical disk in FIG. 1 and a circuit diagram showing the electric circuit of this pickup.

In FIG. 2A, a laser beam source 10 emits a read beam 12 toward a polarization surface 13a of a polarization prism 13. The read beam 12 includes a plurality of frequency components $f_n$ having wavelengths $\lambda_n$ equal to four times the possible depths $\Delta_n$ of the pits P on an optical disk 11 of the present invention. In this embodiment, n=3. The read beam 12 passing the polarization surface 13a is irradiated on the recording surface of the optical disk 11 and is reflected therefrom. The reflected beam comes incident to the polarization surface 13a. As the polarization face of the reflected beam is changed due to the reflection, the reflected beam is reflected at the polarization surface 13a to be incident to a half mirror $HM_1$. This beam is separated into two reflected beam components. One of the reflected beam components enters a $\lambda_1$-pass filter $FL_1$ which passes only a component of a wavelength $\lambda_1$, and the other component enters a half mirror $HM_2$. The $\lambda_1$ component that has passed the filter $FL_1$ enters a bisected photodetector $D_{11}$.

The beam incident to the half mirror $HM_2$ is separated into two reflected beam components. One of the reflected beam components enters a $\lambda_2$-pass filter $FL_2$ which passes only a component of a wavelength $\lambda_2$, and the other component enters a $\lambda_3$-pass filter $FL_3$ which passes only a $\lambda_3$ component. The $\lambda_2$ component that has passed the filter $FL_2$ enters a bisected photodetector $D_{12}$, while the $\lambda_3$ component that has passed the filter $FL_3$ enters a bisected photodetector $D_{13}$.

Figure 2B:
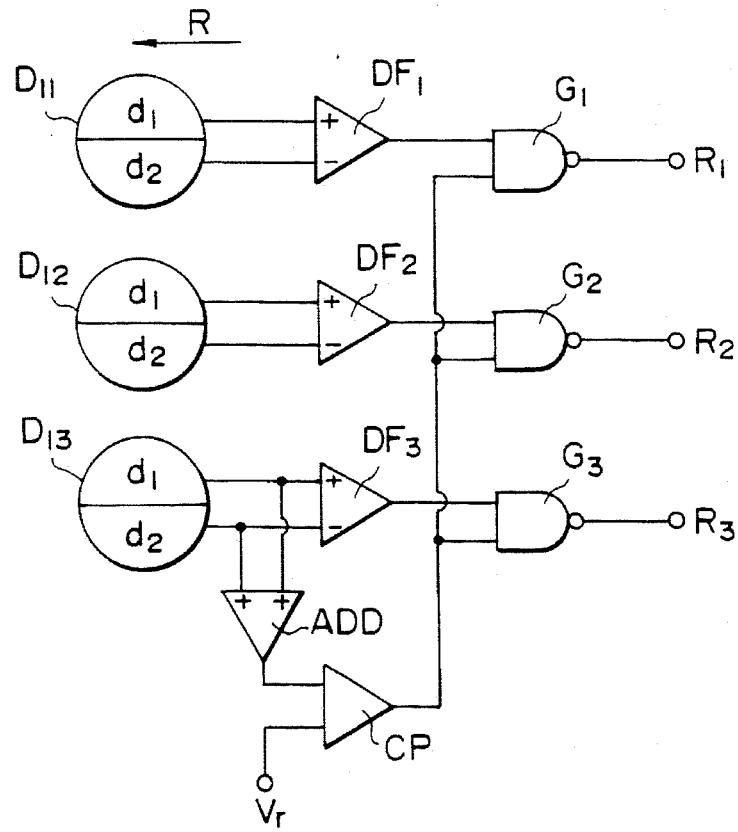

As shown in FIG. 2B, each of the bisected photodetectors $D_{11}$, $D_{12}$ and $D_{13}$ has light-receiving surfaces $d_1$ and $d_2$, and the light outputs of each photodetector are supplied to an associated differential amplifier $DF_1$, $DF_2$ or $DF_3$. The differential outputs of the individual differential amplifiers $DF_1$, $DF_2$ and $DF_3$ are supplied to one of the input terminals of NAND gates $G_1$, $G_2$ and $G_3$, respectively. The outputs of the bisected photodetector $D_{13}$ also become input signals to a summing amplifier ADD whose output is one input signal of a comparator CP. As long as the input signal is lower than a reference voltage $V_r$, the comparator CP supplies a logic "0" signal to the other input terminals of the NAND gates $G_1$, $G_2$ and $G_3$. Upon reception of a low-level signal or a logic "0" signal at one input terminal from the differential amplifier $DF_1$, $DF_2$ or $DF_2$ while receiving the logic "0" signal at the other input terminal from the comparator CP, the NAND gate $G_1$, $G_2$ or $G_3$ outputs a logic "1" signal to an associated output terminal $R_1$, $R_2$ or $R_3$.

Figure 3:
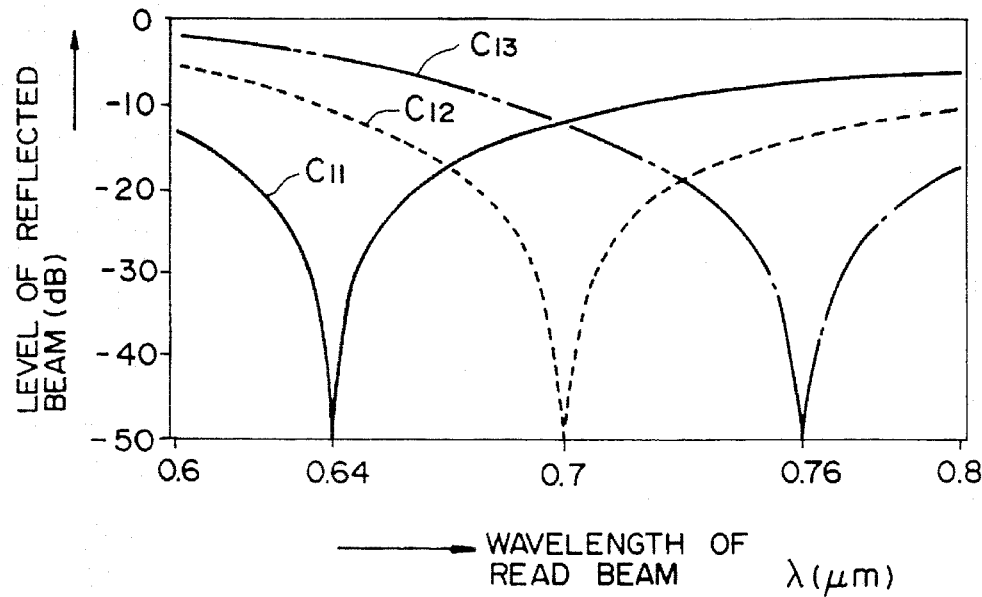
FIG. 3 presents a characteristic diagram showing the relationship between the wavelength of a read beam to be irradiated on pits having a given depth and the level of a difference signal.

FIG. 3 presents a graph showing the relationship between the wavelength $\lambda_n$ of the read beam to be irradiated on pits having a depth $\Delta_n$ and the levels of the output signals of the differential amplifiers $DF_1$, $DF_2$ and $DF_3$.

In FIG. 3, a solid line $C_{11}$ shows a change in the level of the reflected beam when the read beam is irradiated on the pits P with a depth of 0.160 μm while the wavelength of the read beam is changed from 0.60 μm to 0.80 μm. A broken line $C_{12}$ shows a change in the level of the reflected beam when the read beam is irradiated on the pits P with a depth of 0.175 μm while the wavelength of the read beam is changed from 0.60 μm to 0.80 μm. An alternate short and long dash line (phantom line) $C_{13}$ shows a change in the level of the reflected beam when the read beam is irradiated on the pits P with a depth of 0.190 μm while the wavelength of the read beam is changed from 0.60 μm to 0.80 μm.

It is to be noted that 0 dB on the vertical scale corresponds to 30% of the incident amount of the read beam.

It is apparent from FIG. 3 that the output signal level of the differential amplifier $DF_1$ corresponding to the wavelength $\lambda_1$ of 0.64 μm becomes zero or very small as indicated by the characteristic curve $C_{11}$ for the pits P with a depth of 0.160 μm, the output signal level of the differential amplifier $DF_2$ corresponding to the wavelength $\lambda_2$ of 0.70 μm becomes zero or very small as indicated by the characteristic curve $C_{12}$ for the pits P with a depth of 0.175 μm, and the output signal level of the differential amplifier $DF_3$ corresponding to the wavelength $\lambda_3$ of 0.76 μm becomes zero or very small as indicated by the characteristic curve $C_{13}$ for the pits P with a depth of 0.190 μm.

But, the output signal level of the amplifier $DF_1$ becomes large for the pits P with a depth of 0.175 μm or 0.190 μm, the output signal level of the amplifier $DF_2$ becomes large for the pits P with a depth of 0.190 μm or 0.175 μm, and the output signal level of the amplifier $DF_3$ becomes large for the pits P with a depth of 0.160 μm or 0.175 μm.

Therefore, by irradiating one read beam including a plurality of wavelengths $\lambda_1$, $\lambda_2$ and $\lambda_3$ onto the pits P and separating the reflected beam into components for the individual wavelengths $\lambda_1$, $\lambda_2$ and $\lambda_3$ through the respective filters, the difference signal representing the difference between the outputs of the first and second bisected photodetector portions $d_1$ and $d_2$ is acquired for each wavelength component. It is understood that when the difference signal has a predetermined value or a logic "1", pits P with a depth of $\lambda_n/4$ corresponding to the wavelength $\lambda_n$ of the read beam are not in the unit area U, and when the difference signal has a value of zero or a very small value, i.e., a logic "0", pits P with a depth of $\lambda_n/4$ corresponding to the wavelength $\lambda_n$ of the read beam are in the unit area U.

According to the first embodiment, as apparent from the above, one information can be associated with one depth of the pits P, so that with n types of depths equal to or greater than 2 being set for the pits P, when the pits P are provided in one unit area U, this unit area can have two or more pieces of information. This can improve the information recording density.

Figure 4:
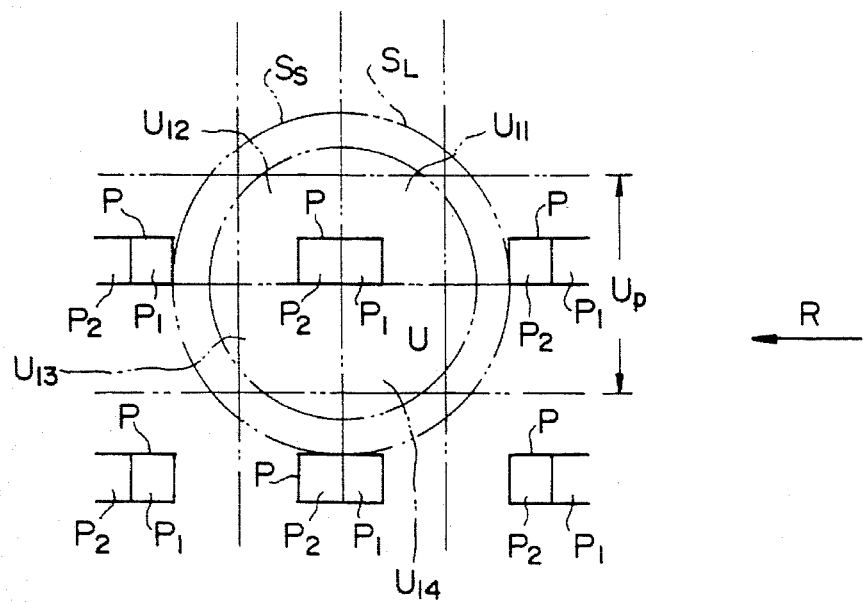
FIG. 4 is an exemplary diagram illustrating the arrangement of pits on the recording surface of an optical disk according to a second embodiment of the present invention.

FIG. 4 presents an exemplary diagram illustrating the arrangement of pits on the recording surface of an optical disk according to a second embodiment of the present invention. The same reference numerals as used in FIG. 1 are given to the corresponding or identical portions in FIG. 4 to avoid their redundant description.

For the optical disk shown in FIG. 4, the unit area U is divided in the circumferential direction and radial direction of the disk to be first to fourth subunits $U_{11}$, $U_{12}$, $U_{13}$ and $U_{14}$. First divided pits $P_1$ are located in the first subunit $U_{11}$, and second divided pits $P_2$ in the second subunit $U_{12}$. The first divided pits $P_1$ and second divided pits $P_2$ have any one of n depths (n: an integer equal to or greater than 2).

Figure 5A:
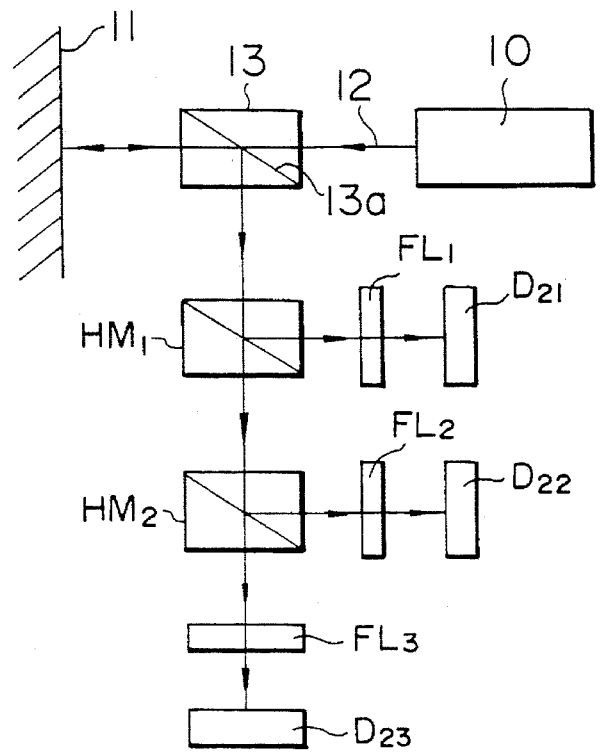
FIGS. 5A and 5B respectively present a cross section showing the optical system of a pickup which picks up information from the optical disk in FIG. 4 and a circuit diagram showing the electric circuit of this pickup.
Figure 5B:
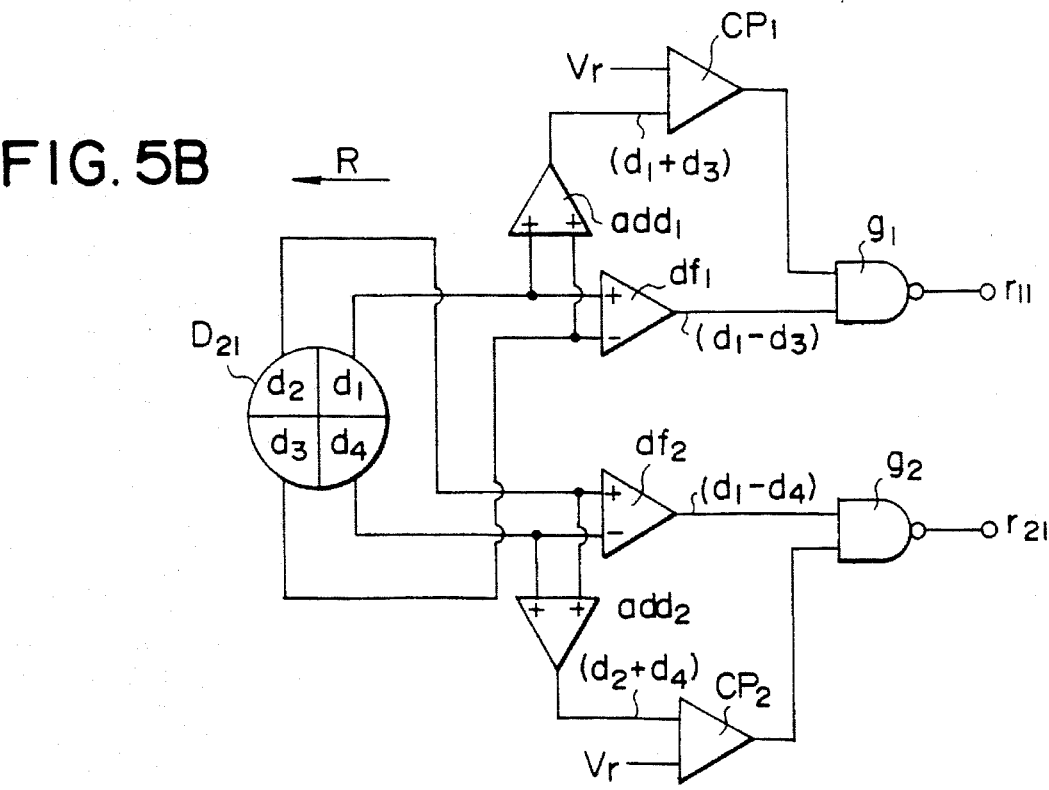

FIG. 5A shows the optical system of a pickup which detects information from the optical disk shown in FIG. 4, and FIG. 5B shows the electric circuit of this pickup.

The optical system in FIG. 5A has the same structure as the one shown in FIG. 2A except that it uses quadrant photodetectors $D_{21}$, $D_{22}$ and $D_{23}$.

In the electric circuit shown in FIG. 5B, the received light signals from the light-receiving surfaces $d_1$, $d_2$, $d_3$ and $d_4$ of each quadrant photodetector $D_{2n}$ are operated in differential amplifiers $df_1$ and $df_2$ to acquire a $(d_1-d_3)$ signal and a $(d_2-d_4)$ signal. The $(d_1-d_3)$ signal is supplied to one input terminal of a NAND gate $g_1$, and the $(d_2-d_4)$ signal is supplied to one input terminal of a NAND gate $g_2$. Summing amplifiers $add_1$ and $add_2$ respectively produce a $(d_1+d_3)$ signal and a $(d_2+d_4)$ signal and supply them to one input terminals of comparators $CP_1$ and $CP_2$. When the $(d_1+d_3)$ signal and $(d_2+d_4)$ signal fall below a reference voltage $V_r$, the comparators $CP_1$ and $CP_2$ output logic "0" signals. The outputs signals of the comparators $CP_1$ and $CP_2$ are respectively supplied to the other input terminals of the NAND gates $g_1$ and $g_2$. The NAND gate $g_1$ outputs a logic "1" on its output terminal $r_{11}$ when the $(d_1-d_3)$ signal becomes a low level (logic "0") while the logic "0" signal is received from the comparator $CP_1$. The NAND gate $g_2$ outputs a logic "1" on its output terminal $r_{21}$ when the $(d_2-d_4)$ signal becomes a low level (logic "0") while the logic "0" signal is received from the comparator $CP_2$.

The quadrant photodetectors $D_{22}$ and $D_{23}$ have the same circuit structure as the one shown in FIG. 5B and have outputs $(r_{12}, r_{22})$ and $(r_{13}, r_{23})$ though not shown. Therefore, a read beam with wavelengths of $\lambda_1$, $\lambda_2$ and $\lambda_3$ can provide a total of six pieces of information $(r_{11}, r_{12})$, $(r_{12}, r_{22})$ and $(r_{13}, r_{23})$ in a single unit area U.

Supposing that the pits $P_1$ and $P_2$ are respectively given two depths $\Delta_1$ and $\Delta_2$ corresponding to two wavelengths $\lambda_1$ and $\lambda_2$ for each unit area U on the optical disk shown in FIG. 4, at least four pieces of information can be recorded in each unit area by the combinations of the positional information of the pits $P_1$ and $P_2$ to the subunits $U_{11}$ and $U_{12}$. It is apparent that the information recording density can be improved.

In FIG. 6, (a) to (d) are exemplary diagrams illustrating the arrangement of pits on the recording surface of an optical disk according to a third embodiment of the present invention. The same reference numerals as used in FIGS. 1 and 4 are given to the corresponding or identical portions in FIG. 6 to avoid their redundant description.

Figure 6A:
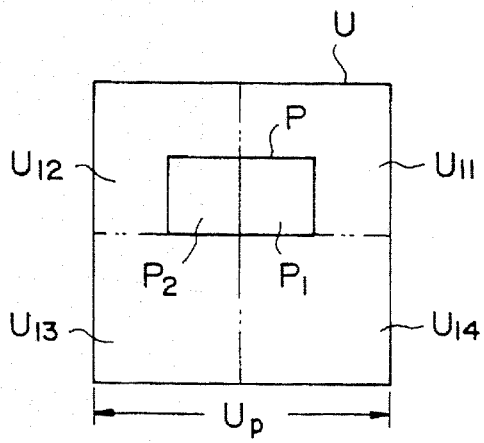
FIGS. 6(a) to 6(d) are exemplary diagrams illustrating the arrangements of pits on the recording surface of an optical disk according to a third embodiment of the present invention.
Figure 6B:
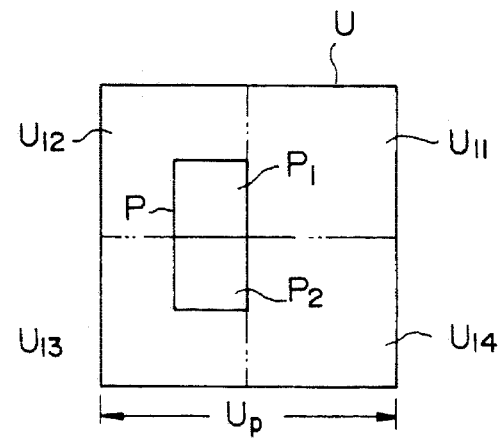
Figure 6C:
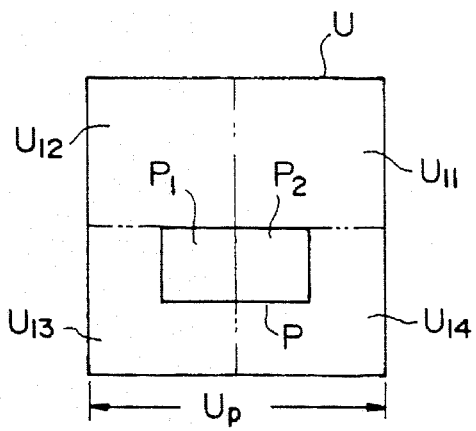
Figure 6D:
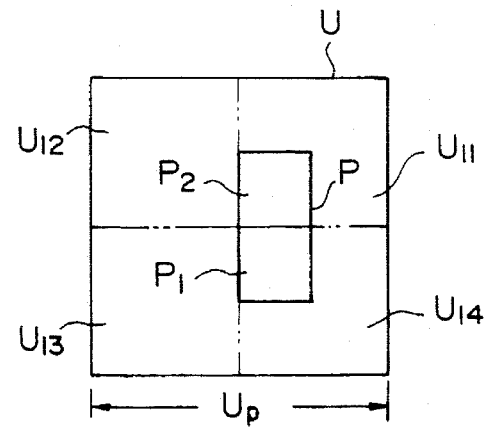

FIG. 6(a) illustrates the case where the first divided pits $P_1$ are provided in the first subunit $U_{11}$ and the second divided pits $P_2$ in the second subunit $U_{12}$. FIG. 6(b) illustrates the case where the first divided pits $P_1$ are provided in the second subunit $U_{12}$ and the second divided pits $P_2$ in the third subunit $U_{13}$. FIG. 6(c) illustrates the case where the first divided pits $P_1$ are provided in the third subunit $U_{13}$ and the second divided pits $P_2$ in the fourth subunit $U_{14}$. FIG. 6(d) illustrates the case where the first divided pits $P_1$ are provided in the fourth subunit $U_{14}$ and the second divided pits $P_2$ in the first subunit $U_{11}$.

FIGS. 7(a) to 7(d) are explanatory diagrams showing the intensity distributions of a reflected beam on the light-receiving surfaces of a quadrant photodetector when a read beam is irradiated on the pits arranged as shown in (a) to (d) in FIG. 6.

FIG. 8 illustrates a detector that detects the pit arrangement.

In FIG. 8, the detector is connected to one ($D_{21}$) of the quadrant photodetectors $D_{21}$, $D_{22}$ and $D_{23}$ provided in the optical system of the pickup.

Summing amplifiers $add_1$, $add_2$, $add_3$ and $add_4$ output signals $S_1=(d_1+d_2)$, $S_2=(d_2+d_3)$, $S_3=(d_3+d_4)$ and $S_4=(d_1+d_4)$, respectively. A comparator $CP_3$ produces logic signals $S_a$, $S_b$, $S_c$ and $S_d$ corresponding to the four input signals $S_1$, $S_2$, $S_3$ and $S_4$. Each of the logic signals $S_a$, $S_b$, $S_c$ and $S_d$ will take a logical value of "1" when its one input signal is greater than the other input signal.

When the first divided pits $P_1$ are provided in the first subunit $U_{11}$ and the second divided pits $P_2$ in the second subunit $U_{12}$ as shown in (a) in FIG. 6, it is apparent from (a) in FIG. 7 that as the sum signal $S_1$ is the largest output among the sum signals $S_1$ to $S_4$, Sa=1 through the comparison of the sum signals $S_1$ to $S_4$ in the comparator $CP_3$. Sa=1 is the information representing that the first and second divided pits $P_1$ and $P_2$ are arranged as shown in (a) in FIG. 6.

Likewise, information representing the arrangement of the first and second divided pits $P_1$ and $P_2$ as shown in (b) to (d) in FIG. 6 can be obtained based on the result of the comparison done in the comparator $CP_3$.

According to the third embodiment of the present invention wherein the arrangement information of the first and second divided pits $P_1$ and $P_2$ are added to the second embodiment, one unit area U can have four times the amount of information available in the second embodiment, thus further improving the information recording density.

That is, pieces of information which correspond in number to the combinations of $(S_a, S_b, S_c, S_d)$ and $(r_{1n}, r_{2n})$ can be recorded in a single unit area U.

Figure 9:
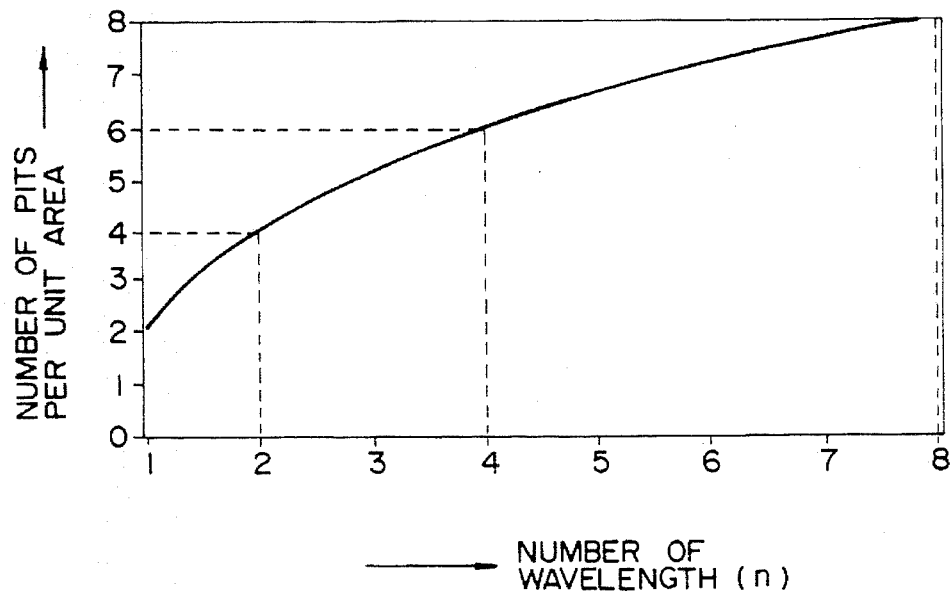
FIG. 9 presents a characteristic diagram showing the relationship between the number of pits per unit and the number of wavelengths according to the third embodiment.

FIG. 9 presents a characteristic diagram showing the relation between the number of pits per unit and the number of wavelengths (depths of pits) in the third embodiment.

Figure 10:
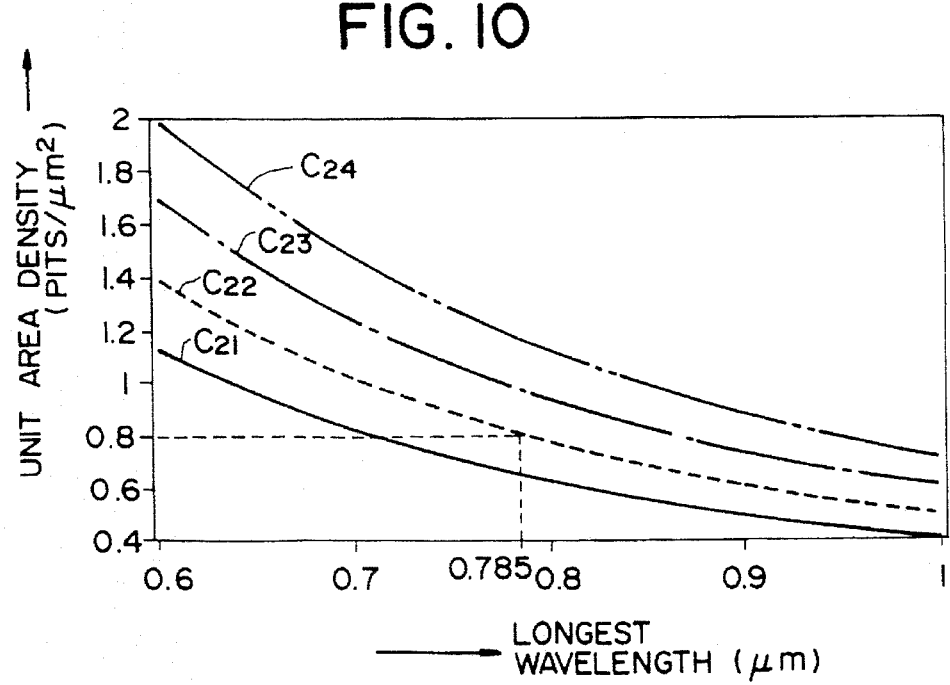
FIG. 10 presents a characteristic diagram showing the relationship between the unit area density and the longest wavelength in use.

FIG. 10 presents a characteristic diagram showing the unit area density and the longest wavelength in use.

In FIG. 10, a solid line $C_{21}$ indicates the unit area density when the number of apertures NA is 0.45 and the longest wavelength $\lambda_L$ ranges from 0.60 μm to 0.80 μm. A broken line $C_{22}$ indicates the unit area density when the number of apertures NA is 0.50 and the longest wavelength $\lambda_L$ ranges from 0.60 μm to 0.80 μm. An alternate long and short dash line $C_{23}$ indicates the unit area density when the number of apertures NA is 0.55 and the longest wavelength $\lambda_L$ ranges from 0.60 μm to 0.80 μm. An alternate long and two short dashes line $C_{24}$ indicates the unit area density when the number of apertures NA is 0.60 and the longest wavelength $\lambda_L$ ranges from 0.60 μm to 0.80 μm.

Next, the recording density will be described below.

Given that the number of wavelengths (depths of pits) is n in the third embodiment shown in FIG. 6, the number of combinations of the depths of the first and second divided pits $P_1$ and $P_2$ is expressed as follows.

*number of combinations=(number of wavelengths)$^2$×4*

The number of pits in those combinations is expressed as follows.

*number of bits=$\log_2$ (number of combinations)=$\log_2$ [(number of combinations)$^2$×4]*

Thus, the relationship between the number of pits per unit U and the number of wavelengths in the third embodiment becomes as shown in the characteristic diagram of FIG. 9.

The size of the unit U is determined by the longest wavelength $\lambda_L$ and is given by the following equation.

*unit size=[$\lambda_L$/($2^{1/2}$×NA)]$^2$*

Thus, the relationship between the longest wavelength $\chi_L$ and the unit density becomes as shown in FIG. 10.

From the above, the recording density in the third embodiment is given as follows.

*recording density={$\log_2$ [number of combinations)$^2$×4]}/[$\lambda_L$/($2^{1/2}$×NA)]$^2$*

When the longest wavelength $\lambda_L$ is 0.785 μm which is the wavelength of the existing pickup, the number of wavelengths is 2 and the number of apertures NA is 0.5 which is the same as the existing one, the recording density becomes 0.8×4=3.2 (pits/μm²), 2.4 times that of the existing CD, from the above equation.

A sync signal may be recorded on the optical disk by inserting a sync pit within a group of consecutive pits and the sync signal can be utilized for detecting a timing when the reading spot coincide with the unit area. The information signal based on the reflected beam may be evaluated at each of the particular sync timings.

In short, the optical disk according to the present invention has pit information recorded by setting multi-leveled depths for the pits provided in individual unit areas continuously segmented in the information recording direction, so that the information recording density can be improved.

According to the optical-disk information reproducing method of the present invention, a beam having a plurality of wavelengths corresponding to four times the multi-leveled depths of pits is irradiated as a read beam to each unit area on the optical disk, pit information is acquired based on the reflected beam from the unit area, and composite pit information recorded on the optical disk is reproduced based on the combination of the arrangement information of the pits in the unit area and the depth information of the pits.

What is claimed is:

1. An information reproducing method of reproducing information from an optical disk having unit areas continuously provided in a circumferential direction, each bit of said information being recorded in the form of a pit, wherein said optical disk comprises at least one pit in each of said unit areas, said pit having a depth of one of n depths, n being an integer having a value of at least two, wherein each bit of said information recorded in the form of a pit has a depth which corresponds respectively to one of said n depths, each bit of said information being recorded by setting a depth of a corresponding pit, said information reproducing method comprising the steps of:

irradiating a read beam having frequency components of n wavelengths corresponding to four times said n depths, respectively, to a row of said unit areas; and acquiring pit information based on an intensity distribution in a plane perpendicular to an optical axis of a reflected beam from said row of unit areas.

2. An information reproducing method of reproducing information from an optical disk having unit areas continuously provided in a circumferential direction, each bit of said information being recorded in the form of a pit, wherein said optical disk comprises at least one pit in each of said unit areas, said pit having a depth of one of n depths, n being an integer having a value of at least two, wherein each bit of said information recorded in the form of a pit has a depth which corresponds respectively to one of said n depths, each bit of said information being recorded by setting a depth of a corresponding pit, and wherein each of said unit areas is divided in a circumferential direction into at least two sub areas arranged in a radial direction of said disk, at least one of said two sub areas comprising one pit corresponding to at least one bit, said information reproducing method comprising the steps of:

irradiating a read beam having frequency components of n wavelengths corresponding to four times said n depths, respectively, to a row of said unit areas;

acquiring pit information for each of said sub areas based on an intensity distribution in a plane perpendicular to an optical axis of a reflected beam from said row of unit areas; and acquiring composite pit information from a combination of said pit information for said sub areas.

3. An information reproducing method of reproducing information from an optical disk having unit areas continuously provided in a circumferential direction, each bit of said information being recorded in the form of a pit, wherein said optical disk comprises at least one pit in each of said unit areas, said pit having a depth of one of n depths, n being an integer having a value of at least two, wherein each bit of information recorded in the form of a pit has a depth which corresponds respectively to one of said n depths, each bit of said information being recorded by setting a depth of a corresponding pit, and wherein each of said unit areas is divided in a circumferential direction into at least two sub areas arranged in a radial direction of said disk, at least one of said two sub areas comprising one pit corresponding to at least one bit, wherein each of said unit areas is further divided into two in a radial direction of said disk to provide four sub areas, wherein said pit is divided into two divided pits, said divided pits being arranged in any two of said four sub areas, said information reproducing method comprising the steps of:

irradiating a read beam having frequency components of n wavelengths corresponding to four times said n depths, respectively, to a row of said unit areas;

acquiring distribution information of said two divided pits in said four sub areas and divided-pit information of said two divided pits based on an intensity distribution in a plane perpendicular to an optical axis of a reflected beam from said row of unit areas; and acquiring composite pit information from a combination of said distribution information of said two divided pits and said divided-pit information for every said two divided pits.

\* \* \* \* \*